United States Patent [19]
Stevens et al.

[11] Patent Number: 6,078,048
[45] Date of Patent: Jun. 20, 2000

[54] IMMERSION ECHELLE SPECTROGRAPH

[75] Inventors: Charles G. Stevens, Danville; Norman L. Thomas, Livermore, both of Calif.

[73] Assignee: The Regents of the University of California, Oakland, Calif.

[21] Appl. No.: 09/066,662

[22] Filed: Apr. 27, 1998

[51] Int. Cl.[7] .................................. G01J 3/18; G02B 5/18
[52] U.S. Cl. ................... 250/339.02; 356/305; 356/326; 356/328; 356/334
[58] Field of Search ................... 356/328, 305, 356/326, 334; 250/339.02

[56] References Cited

U.S. PATENT DOCUMENTS

| | | | |
|---|---|---|---|
| 4,205,229 | 5/1980 | Beer | 250/352 |
| 5,018,856 | 5/1991 | Harnly et al. | 356/312 |

FOREIGN PATENT DOCUMENTS

| | | | |
|---|---|---|---|
| 54 -4147 | 12/1979 | Japan | 356/328 |
| 1822932 A1 | 6/1993 | U.S.S.R. | 356/328 |

OTHER PUBLICATIONS

D. Bloor, "A rapid scanning spectrometer for the far infra-red (200–25 cm–1)." *Spectrochimica Acta*, vol. 21, pp. 595–603, Mar. 1965.

*Primary Examiner*—Constantine Hannaher
*Attorney, Agent, or Firm*—L E. Carnahan; Alan H. Thompson

[57] ABSTRACT

A small spectrograph containing no moving components and capable of providing high resolution spectra of the mid-infrared region from 2 microns to 4 microns in wavelength. The resolving power of the spectrograph exceeds 20,000 throughout this region and at an optical throughput of about $10^{-5} cm^2$ sr. The spectrograph incorporates a silicon immersion echelle grating operating in high spectral order combined with a first order transmission grating in a cross-dispersing configuration to provide a two-dimensional (2-D) spectral format that is focused onto a two-dimensional infrared detector array. The spectrometer incorporates a common collimating and condensing lens assembly in a near aberration-free axially symmetric design. The spectrometer has wide use potential in addition to general research, such as monitoring atmospheric constituents for air quality, climate change, global warming, as well as monitoring exhaust fumes for smog sources or exhaust plumes for evidence of illicit drug manufacture.

21 Claims, 4 Drawing Sheets

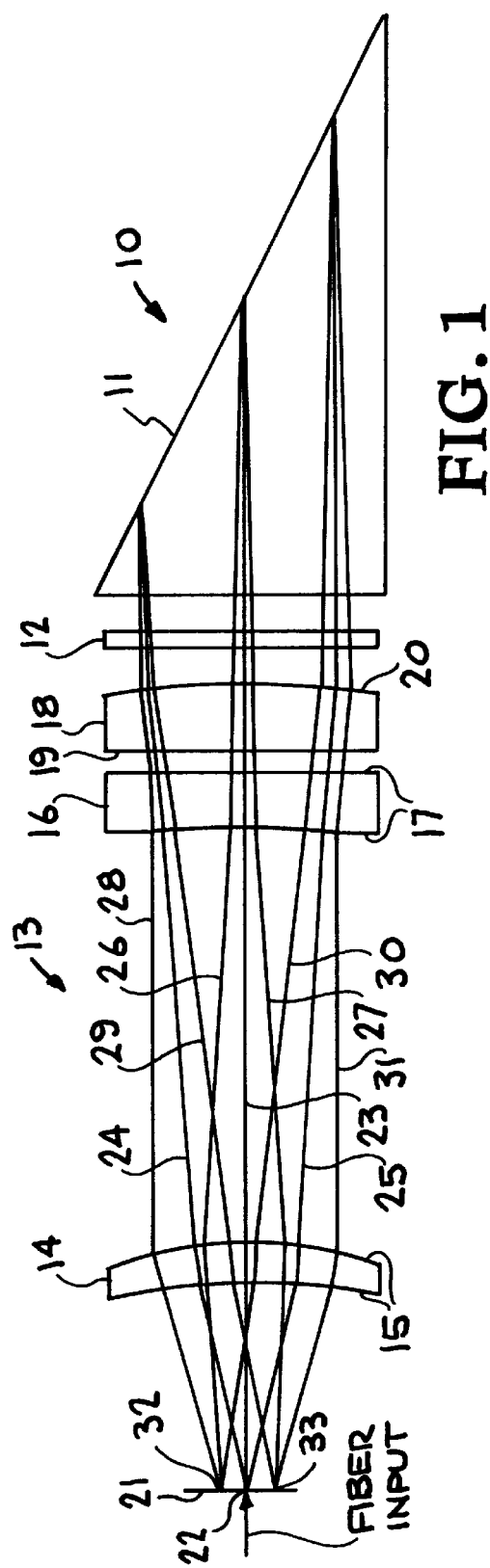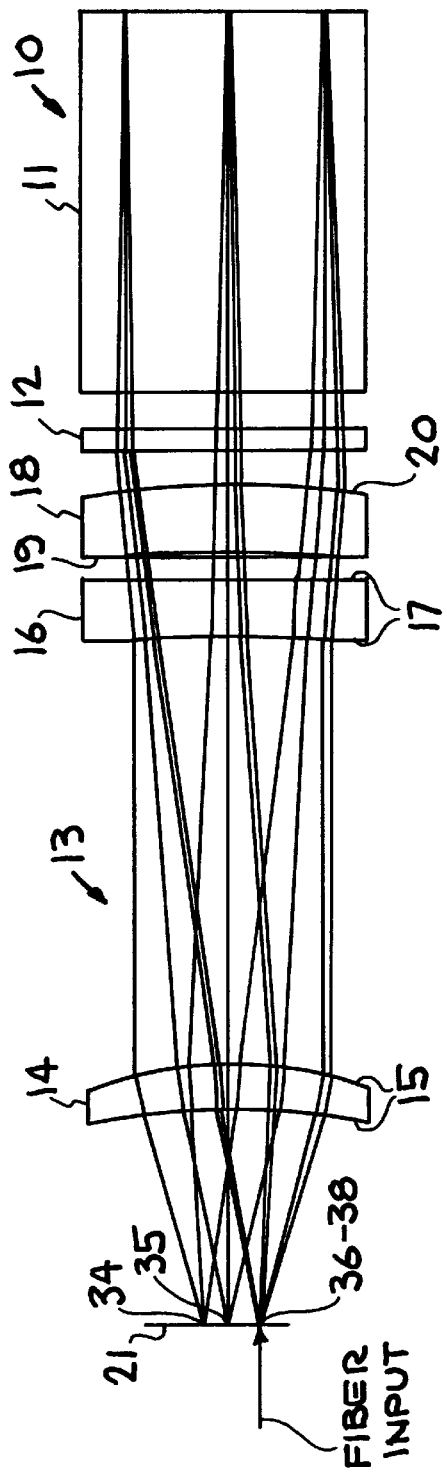

IMMERSION ECHELLE SPECTROGRAPH

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to spectrographs, particularly to a spectrograph capable of providing high resolution spectra of the mid-infrared region, and more particularly to a spectrography incorporating a silicon immersion echelle grating and a transmission grating in a cross-dispersing configuration in combination with an infrared detector array.

In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 $cm^{-1}$. This provides for maximum sensitivity to simple molecules with the narrowest spectral features, allows for corrections for the presence of atmospheric constituents, maximizing species selectivity, and provides greater opportunity to detect unanticipated species. Fourier transform spectrometers, such as Michelson interferometers, have long been the instrument of choice for high resolution spectroscopy in the infrared spectral region. This derives from its advantage in light gathering power and spectral multiplexing over conventional dispersive spectrometers. For remote sensing applications and for those applications in hostile environments, the Fourier transform spectrometer, such as the Michelson interferometer, is ill suited for these applications due to the requirements for keeping a moving mirror aligned to better than a wavelength over the mirror surface. Furthermore, this spectrometer collects amplitude variations over time that are then transformed into frequency information for spectral generation. Consequently, this approach requires stable radiation sources and has difficulty dealing with rapidly changing reflectors or emissions as generally encountered in remote field observations, particularly from moving observation platforms. Furthermore, under conditions where the noise terms are dominated by the light source itself, the sensitivity of the instrument is limited by the so-called multiplex disadvantage.

Dispersive infrared instruments on the other hand acquire spectral information serially in time, are generally much larger instruments at the same spectral resolution, and have less light gathering power. Thus, there has been a need for an instrument that provides simultaneous spectral data collection over a wide spectral band without suffering the multiplex disadvantage.

Recent advances in two-dimensional infrared detector array capacity and performance along with advances in chemical micromachining technology provide the opportunity for creating a new class of remote sensing infrared spectrometers.

For the past several years the Lawrence Livermore National Laboratory (LLNL) has been involved in the development of effluent sensing technology. These development efforts have resulted in a new generation of rugged, high-performance infrared (IR) spectrometers that combine excellent spectral resolution with high reliability and small package size. The LLNL design of these field instruments is based on the precision fabrication of silicon and germanium immersion gratings. It is the high index of refraction of these materials that leads to highly dispersive gratings and enables immersion grating spectrometers to be very compact. Spectrometers capable of mid-IR and longwave-IR coverage can be realized with this new technology. This technology and early design developments over the past several years have led to the design of a compact, rugged cryogenic spectrometer covering the atmospheric transmission bands (K and L bands) between 2.3 and 4.2 microns. The spectrometers are designed for airborne operation. Such early design developments at LLNL are described in an article entitled "Cross dispersion infrared spectrometry (CDIRS) for remote chemical sensing" by C. G. Stevens et al. In addition, document UCRL-JC-120743, "Design of a mid-IR immersion echelle grating spectrograph for remote sensing", N. L. Thomas et al., bearing a date of May 9, 1995, describes the design of a second generation of remote sensing echelle grating spectrometers developed at LLNL and is based on the availability of silicon immersion gratings of high precision. The dispersion of an immersion grating is increased in proportion to the refractive index. For silicon this factor is 3.4, permitting a very significant reduction in the overall size of the spectrometer while maintaining the same resolution and light throughout. The objective of the above-referenced second generation design was to develop a spectrometer covering the mid-infrared atmospheric windows with no moving components by using a cross dispersion approach. The earlier LLNL designs, see above-referenced article by C. G. Stevens et al., utilized an echelle grating crossed with a constant dispersion prism doublet. This provided for very efficient detector array utilization. However, with a smaller immersion grating spectrometer, the need to increase prism dispersion forced a number of design compromises in overall size and system performance. The second generation design, see above-referenced UCRL-JC-120743 is based on the use of a high order silicon immersion grating crossed with a concave grating operating in a Wadsworth configuration.

The present invention satisfies the above-referenced need for an instrument that provides simultaneous spectral data collection over a wide spectral band without suffering the multiplex disadvantage, and like the prior LLNL spectrometer designed, the present invention utilized a silicon immersion echelle grating operating in high spectral order, but in the present invention the silicon immersion grating is combined with a first order transmission grating in a cross-dispersing configuration to provide a two- dimensional spectral format that is focused onto a two-dimensional infrared detector array. In addition, the spectrometer of this invention incorporates a common collimating and condensing lens assembly in a near aberration-free axially symmetric design, which enable a further reduction in size which results in a very small (tiny) immersion echelle spectrograph with no moving components.

SUMMARY OF THE INVENTION

It is an object of the present invention to provide an immersion echelle spectrograph.

A further object of the invention is to provide a spectrometer which enables simultaneous spectral data collection over a wide spectral band without suffering the multiplex disadvantage.

A further object of the invention is to provide ways to create two-dimensional spectral images for simultaneous detection of entire infrared spectral regions by two-dimensional detector arrays.

A further object of the invention is to provide ways to utilize immersion gratings that increase the dispersive power of a spectrometer by factors greater than 3, thereby allowing greater than ⅓ reduction in spectrometer size.

Another object of the invention is to provide a spectrometer that is small enough to practically cool to cryogenic temperatures thereby eliminating the main source of noise of dispersive spectrometers in the infrared spectral region.

Another object of the invention is to provide a spectrometer that utilizes a very coarse high order silicon immersion grating coupled to a cross dispersive order sorting transmission grating.

Another object of the invention is to provide a very small spectrometer wherein the small size is made possible by reflecting the radiation back from the echelle grating through a lens assembly that serves both as collimator and condenser, an axially-symmetric design.

Another object of the invention is to provide a very small spectrograph containing no moving components and capable of providing high resolution spectra of the mid-infrared region from about 2 microns to about 5 microns in wavelength.

Another object of the invention is to provide a spectrometer which includes an immersion echelle, a transmission grating, and a collimator/decollimator lens assembly in a near aberration-free axially symmetric arrangement.

Other objects and advantages of the present invention will become apparent from the following description and accompanying from the following description and accompanying drawings. The invention is a tiny immersion echelle spectrograph. The invention involves cross-dispersion echelle designs coupled with two-dimensional infrared detector arrays, which offer full spectral coverage with no moving components. Spectrometers capable of mid-infrared coverage can be realized by the present invention. The high order immersion grating coupled with a cross dispersive order sorting transmission grating and a lens assembly that serves both as a collimator and a condenser, all positioned in an axially-symmetric arrangement, enable a very small size spectrometer. The immersion grating spectrometer of this invention eliminates off-axis aberrations, providing diffraction-limited performance in field-rugged, compact packages.

Applications for the small spectrometer of the present invention include remote atmospheric chemical testing, stack emissions monitors, fence-line monitors, roadside vehicular emissions monitors, and real-time process monitoring and control.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 1 is a side view of an embodiment of a tiny immersion echelle spectrometer made in accordance with the present invention.

FIG. 2 is a plan view of an embodiment of the invention similar to the FIG. 1 embodiment.

DETAILED DESCRIPTION OF THE INVENTION

Figure 3:
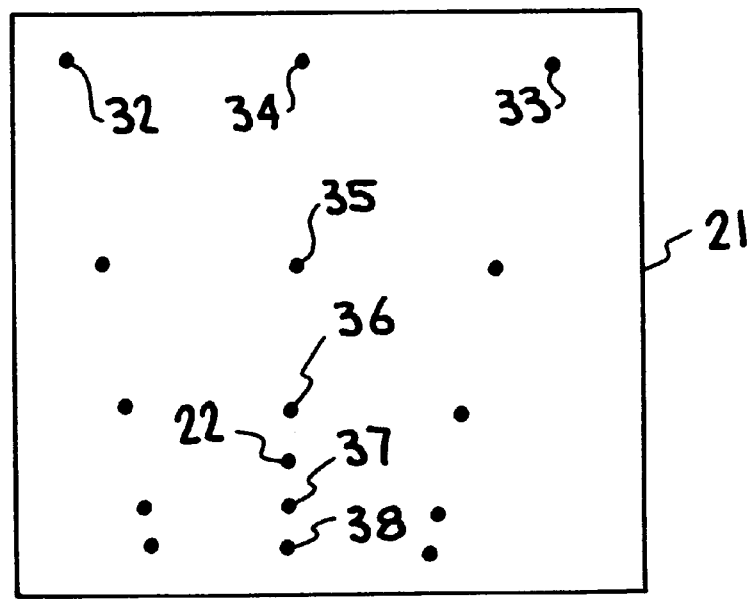
FIG. 3 is a front view of an image plane of the FIGS. 1–2 embodiment showing an image spot diagram layout for selected wavelengths.

The present invention involves a very small spectrograph containing no moving components and capable of providing high resolution spectra of the mid-infrared region from about 2 microns to about 5 microns in wavelength. The invention enables ways to create two-dimensional spectral images for simultaneous detection of entire infrared spectral regions by two-dimensional detector arrays. Thus, the invention provides simultaneous spectral data collection over a wide spectral band without suffering the multiplex disadvantage. The resolving power of the spectrograph exceeds 20,000 throughout this infrared region and at an optical throughput of $10^{-5}\text{cm}^2$ sr. The invention provides ways to utilize immersion gratings that increase the dispersive power of the spectrometer by factors greater than 3, thereby allowing greater than ⅓ reduction is spectrometer size. The spectrometer of this invention is small enough to practically cool to cryogenic temperatures thereby eliminating the main source of noise of dispersive spectrometers in the infrared region. The unique features of the tiny immersion echelle spectrograph (TIES) of this invention are the use of a very coarse high order silicon immersion grating coupled to a cross dispersive order sorting transmission grating to provide a two-dimensional spectral format that is focused onto a two-dimensional infrared detector array. The small spectrometer size is made possible by reflecting the radiation back from the echelle grating though a lens assembly that serves both as collimator and condenser in a near aberration-free axially-symmetric arrangement.

Referring now to the drawings, FIG. 1 is a side view of an embodiment of the invention illustrating the radiation as it passes through and is reflected by the components of the spectrometer. As shown in FIG. 1, the spectrometer generally indicated at 10 comprises an immersion echelle or grating, such as silicon, 11, a transmission grating, such as zinc selenide, 12, a collimator/decollimator lens assembly generally indicated at 13 composed of a lens 14, such as silicon, having opposite curved side surfaces 15, a lens 16, such as germanium, having straight side surfaces 17, and a lens 18, such as silicon, having straight and curved side surfaces 19 and 20, with curved surface 20 being adjacent to transmission grating 12. A detector assembly image plane 21 is located at the focal point of lens 14, and a fiber input, indicated by legend, is provided to direct radiation indicated by arrow through the image plane 21. A direct optical coupling could be used in place of the fiber input. The transmission grating can also be constructed of silicon, germanium, and chacalconide glass (Ge—As—Se), and the lens 14, 15, and 16 may be composed of any one of silicon, germanium, and chacalconide glass.

As shown in FIG. 1, a radiation signal or optical ray passing through image plane 21 at a point 22 is split into three rays for illustration purposes and indicated at 23, 24, and 25, which passes through lenses 14, 16, and 18, through transmission grating 12, and into immersion grating 11, where the rays are diffracted and reflected back as legs 26–27, 28–29, and 30–31, which pass back through transmission grating 12, lens 18, 16 and 14 onto the surface of image plane 21 as indicated at points 32 and 33. Note that ray legs 26, 28 and 30, comprised of the longest wavelengths, are focused by lens 14 onto point 32 of image plane 21, while ray legs 27, 29, and 31, comprised of the shortest wavelengths, are focused by lens 14 onto point 33 of image plane 21. Thus, by reflecting the radiation back from the echelle grating 11 through the transmission grating 12 and the lens assembly 13, that serves both as collimator and condenser (decollimator), and with all components in an axially-symmetric arrangement, the size of the overall arrangement is reduced. For example, the overall length may be less than 8 inches and the diameter less than 2 inches.

The FIG. 2 embodiment shows a plan (top) view with the optical rays terminated at the echelle grating mid-point. Also, additional optical rays are illustrated in FIG. 2 as compared to FIG. 1 due to this embodiment being a plan or top view of the axially-symmetric arrangement, and the initial optical ray passing through image plane 21' at point 22' is split into more than the three rays of FIG. 1, as indicated at 35–38, and with only a portion of the reflected ray legs being illustrated. Note that ray legs 34 and 35 are comprised of the longest wavelengths and the ray legs 36–38 are comprised of the shortest wavelengths.

FIG. 3 shows the optical spot diagrams for several illustrative wavelengths in the image plane 21 of the embodiment of FIGS. 1 and 2. The wavelengths range from 4.2 microns at spot or point 32 to 2.3 microns at spot or point 38. The spots all fall within an 8×8 mm rectangle. The fiber input, point 22 or 22' is located within the image plane 21.

Figure 4:
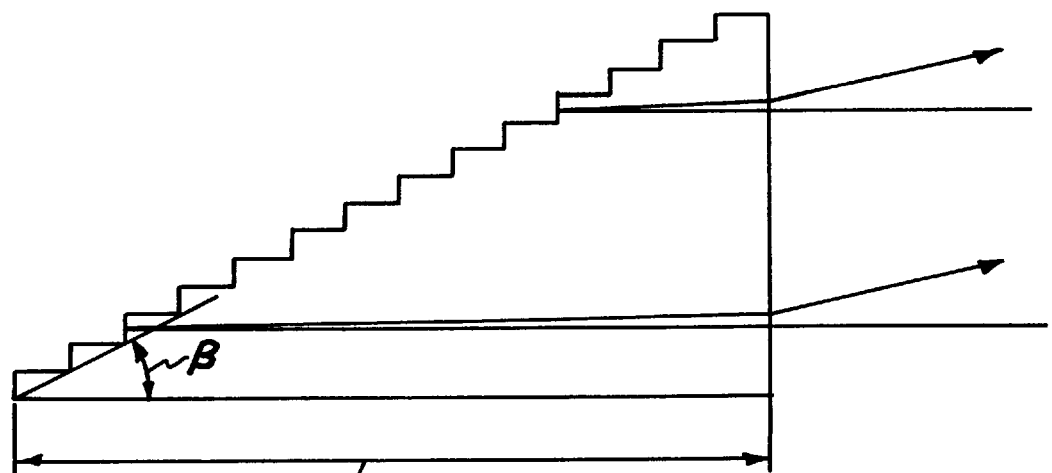
FIG. 4 is a cross-sectional view of an embodiment of an immersion echelle grating such as utilized in the embodiments of FIGS. 1 and 2.

FIG. 4 illustrates an enlarged view of an embodiment of an immersion echelle grating such as immersion echelle 11 of FIG. 1. The echelle grating of FIG. 4 is shown with the entrance face normal to the optic axis. For example, the echelle immersion grating frequency may be 13.5 grooves/mm, with a blaze angle of 63.5°, the echelle orders ranging from 108 to 194, and where used with focal plane array detection, a total of 86 spectral orders (each having a free spectral range of 22 cm$^{-1}$ in this example) can be displayed simultaneously. The optical coupling or fiber input enters between orders 159 and 181 in a remote sensing spectrometer. This is the wavelength region where radiation is negligibly transmitted by the atmosphere and consequently this dark region can be used to optically couple radiation into the spectrometer. The presence of the refracting medium increases the resolving power and dispersion of the grating by a factor equal to the index of refraction and decreases the spectral range by the same factor. In order to maintain the same free spectral range (e.g., 22 cm$^{-1}$), the grating period in the direction of the optic axis can be decreased by the index of refraction ($\lambda$) of silicon, a factor of 3.4, or the index of germanium, a factor of 4. The resolving power (R) of the grating of FIG. 3 as a function of wavelength ($\lambda$) is:

$$R = \frac{nD}{1/2\lambda}$$

The dispersion (d) of the grating of FIG. 3 is:

$$d = \frac{n}{(1/2\lambda)\tan B}$$

For additional details relative to the development of a silicon immersion echelle grating of FIG. 4, see P. J. Kuzmenko et al., "Fabrication and testing of a silicon immersion grating from infrared spectroscopy", Optics, Imaging, and Instrumentation, SPIE, Vol. 2266, pg. 566–577, (1994).

Figure 5:
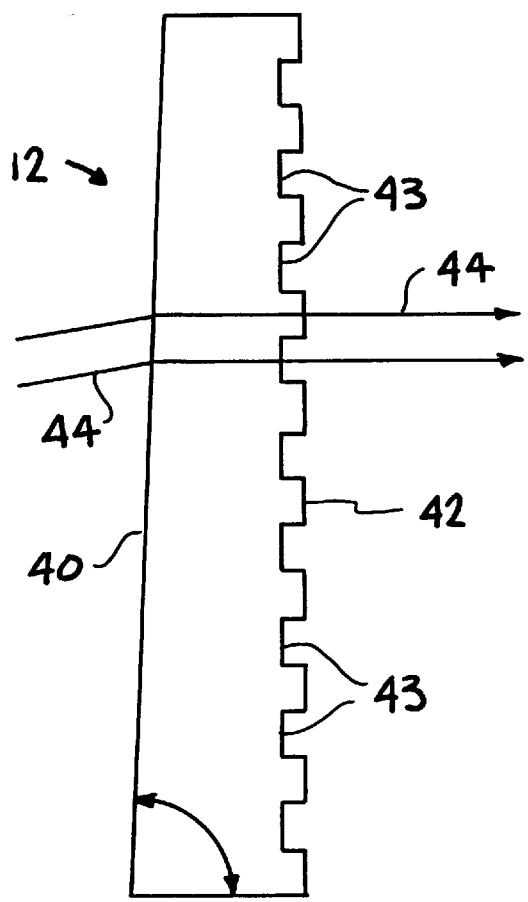
FIG. 5 is a cross-sectional view of an embodiment of a transmission grating utilized in the embodiments of FIGS. 1 and 2.

FIG. 5 illustrates in cross-section an embodiment of the transmission grating 12 of FIG. 1. As shown, the grating 12, a silicon prism, for example, has a first side 40 having a wedge angle 41 of 2°, for example, and a second side 42 having a plurality of grooves 43, there being 33.3 grooves/mm. The wedge angle of the first side 40 straightens the optic axis as indicated by arrows 44, providing a spectrometer geometry of a simple cylinder.

Figure 6:
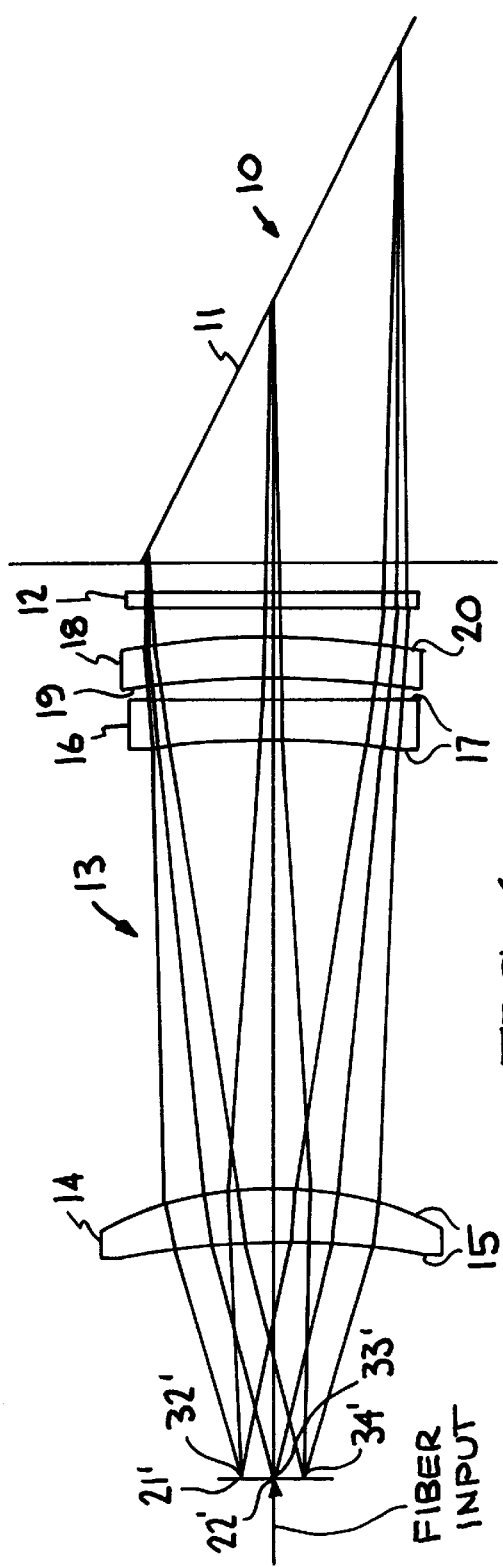
FIGS. 6 and 7 illustrate side and plan views of another embodiment of the immersion echelle spectrometer.
Figure 7:
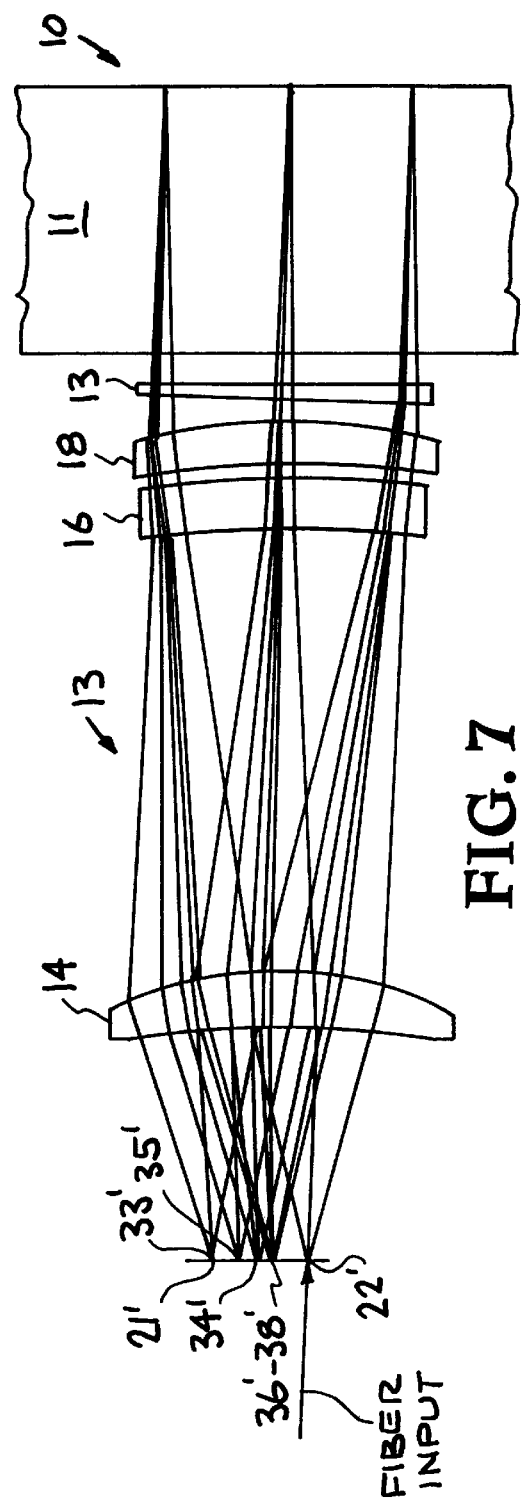

The embodiment of FIGS. 6 and 7 differs from the embodiment of FIGS. 1 and 2, primarily in the location of the fiber input, and thus corresponding components have been given corresponding reference numerals. By comparing FIGS. 6–7 with FIGS. 1–2, the image plane 21 and fiber input point 22 of FIGS. 1–2 are coextensive, but in FIGS. 6–7 the fiber input point 22' is not coextensive with image plane 21', the fiber input point 22' being spaced from the image plane 21', whereby a detector can more easily be located adjacent the image plane 21' of FIGS. 6–7 than in FIGS. 1–2.

Figure 8:
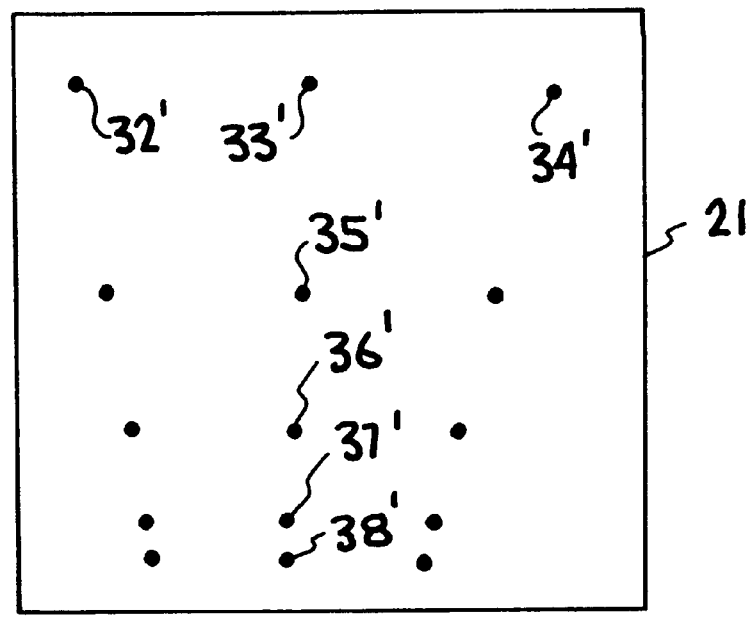
FIG. 8 is a front view of an image plane of the FIGS. 6–7 embodiment showing an image spot diagram layout for selected wavelengths.

FIG. 8 shows the optical spot or point diagrams for several illustrative wavelengths in the image plane 21' of the embodiment of FIGS. 6 and 7. The wavelengths shown range from 4.2 microns at spot or point 32' to 2.3 microns at spot or point 38'. The spot diagrams all fall within a 8×8 mm rectangle. The fiber input point 22' in this embodiment is located below the image plane 21' and not within the image plane as in the FIGS. 1–2 embodiment.

It has thus been shown that the present invention provides a very small high-resolution, mid-infrared spectrometer with the following performance specification: 1) spectral resolving power ranging to 30,000 ($\lambda/\Delta\lambda$)2) compact size, 2" diameter×8" length; and 3) spectral range of 2 to 5 microns. In addition, the spectrometer has the following advantages: 1) no moving parts for high reliability and low maintenance; 2) simple designs for ease of manufacture; 3) cryogenic options for maximum sensitivity; and 4) maximum immunity to source noise. The spectrometer of FIGS. 1 or 6 could be used with an air-interface, or conventional echelle grating rather than the immersion grating with a decrease in resolving power of approximately a factor of 3.4 resulting in a medium resolution instrument.

While particular embodiments, materials, parameters, etc., have been described and illustrated, such are not intended to be limiting. Also, while three lens have been utilized in the illustrated embodiments, it is anticipated that either two or four lens may be used, but such have not been experimentally verified. Modifications and changes may become apparent to those skilled in the art, and it is intended that the invention be limited only by the scope of the appended claims.

What is claimed is:

1. A device having no moving components for creating two-dimensional spectral images for simultaneous detection of entire infrared spectral regions by two-dimensional detector arrays, including:
   an immersion echelle grating;
   a transmission grating; and
   a collimator/decollimator lens assembly.

2. The device of claim 1, wherein said echelle grating, transmission grating, and lens assembly are positioned in an axially-symmetric arrangement.

3. The device of claim 1, wherein said immersion echelle grating is constructed of material selected from the group consisting of silicon and germanium.

4. The device of claim 1, additionally including a detector image plane positioned in axially alignment with said echelle grating, transmission grating, and lens assembly.

5. The device of claim 1, wherein said lens assembly includes three lens, two lens being constructed of silicon and one lens being constructed of germanium.

6. The device of claim 1, constructed to provide a high resolution spectra of a mid-infrared region from 2–5 microns in wavelength.

7. The device of claim 1, wherein said immersion echelle has a frequency of 13.5 grooves/mm.

8. A spectrograph containing no moving components and capable of providing high resolution spectra of the mid-infrared region from about 2–5 microns in wavelength, including:

a silicon immersion echelle grating operating in high spectral order combined with a first order transmission grating in a cross-dispersing configuration.

9. The spectrograph of claim 8, additionally including a collimating and condensing lens assembly.

10. The spectrograph of claim 9, wherein each lens of said lens assembly is composed of material selected from the group consisting of silicon, germanium, and chacalconide glass.

11. The spectrograph of claim 9, additionally including an image plane of a two-dimensional infrared detector array, whereby radiation passing through said lens assembly is focused onto said detector array.

12. The spectrograph of claim 11, wherein said echelle grating, said transmission grating, said lens assembly, and said detector image plane are mounted in a near aberration-free axially symmetric arrangement.

13. The spectrograph of claim 11, constructed to provide a spectral resolving power which exceeds 20,000 throughout said mid-infrared region.

14. The spectrograph of claim 11, constructed to have a two inch diameter and eight inch length.

15. The spectrograph of claim 8, wherein said silicon immersion echelle grating has a tapered surface containing 12.3 to 18.4 grooves/mm for a 20–30 $cm^{-1}$ free spectral range.

16. The spectrograph of claim 15, wherein said silicon immersion echelle grating has a tapered surface containing 13.5 grooves/mm for a 22 $cm^{-1}$ free spectral range.

17. The spectrograph of claim 8, wherein said transmission grating is constructed of material selected from the group consisting of infrared transmitting material including zinc selenide, silicon, germanium, and chacalconide glass.

18. The spectrograph of claim 17, wherein said transmission grating is a phase grating.

19. The spectrograph of claim 8, wherein said transmission grating includes a first side having a wedge angle.

20. The spectrograph of claim 19, wherein said transmission grating additionally includes a second side having a plurality of grooves.

21. The spectrograph of claim 20, wherein said wedge angle is 2°, and wherein said grooves define 33.3 grooves/mm.

* * * * *